US012761241B2

(12) United States Patent
Sadeghian Marnani et al.

(10) Patent No.: US 12,761,241 B2
(45) Date of Patent: Oct. 13, 2026

(54) SCANNING PROBE MICROSCOPY SYSTEM AND METHOD OF OPERATING SUCH A SYSTEM

(71) Applicant: Nearfield Instruments B.V., Rotterdam (NL)

(72) Inventors: Hamed Sadeghian Marnani, Rotterdam (NL); Arseniy Kalinin, Rotterdam (NL); Ruud Ruizenaar, Berkel en Rodenrijs (NL); Jakob Van De Laar, Oosterhout (NL)

(73) Assignee: Nearfield Instruments B.V., Rotterdam (NL)

( * ) Notice: Subject to any disclaimer, the term of this patent is extended or adjusted under 35 U.S.C. 154(b) by 288 days.

(21) Appl. No.: 18/721,243

(22) PCT Filed: Dec. 23, 2022

(86) PCT No.: PCT/NL2022/050760

§ 371 (c)(1),
(2) Date: Jun. 18, 2024

(87) PCT Pub. No.: WO2023/121467

PCT Pub. Date: Jun. 29, 2023

(65) Prior Publication Data

US 2025/0067769 A1 Feb. 27, 2025

(30) Foreign Application Priority Data

Dec. 24, 2021 (NL) .................................... 2030289

(51) Int. Cl.
*G01Q 10/06* (2010.01)
*G01Q 60/32* (2010.01)

(52) U.S. Cl.
CPC .......... *G01Q 10/065* (2013.01); *G01Q 60/32* (2013.01)

(58) Field of Classification Search
CPC ............................ G01Q 10/065; G01Q 60/32
See application file for complete search history.

(56) References Cited

U.S. PATENT DOCUMENTS 6,880,386 B1 * 4/2005 Krotil .................. G01N 19/02 73/105
7,877,816 B2 * 1/2011 Spizig .................. G01Q 10/06 977/851

(Continued)

OTHER PUBLICATIONS

XP012213513 (Ahmad Ahmad et al., Journal of Vacuum Science, Nov. 9, 2016).

(Continued)

*Primary Examiner* — Jonathan M Dunlap
(74) *Attorney, Agent, or Firm* — Banner & Witcoff, Ltd.

(57) ABSTRACT

The present document relates to a scanning probe microscopy system comprising a sample support structure, a sensor head including a probe, a deflection sensor unit, and actuators including a Z-motion actuator and a scanning actuator. The system further comprises a control unit, able to receive the deflection sensor signal and control the actuators. The control unit comprises multiple signal processing units, each enabling to: receive the deflection signal, provide a processed signal, and cooperating with a triggering unit which compares the processed signal against a predefined triggering condition, and generates a trigger when the condition is met.

23 Claims, 5 Drawing Sheets

(56) References Cited

U.S. PATENT DOCUMENTS

| | | | | |
|---|---|---|---|---|
| 8,769,710 | B2 * | 7/2014 | Moon | G01Q 20/00<br>850/4 |
| 10,845,382 | B2 * | 11/2020 | Su | G01Q 60/34 |
| 11,307,220 | B2 * | 4/2022 | Osechinskiy | G01Q 20/04 |
| 2004/0206166 | A1 | 10/2004 | Proksch et al. | |
| 2005/0029450 | A1 | 2/2005 | Hough et al. | |
| 2007/0114406 | A1 * | 5/2007 | Spizig | B82Y 35/00<br>250/310 |
| 2014/0137300 | A1 * | 5/2014 | Moon | G01Q 10/065<br>850/1 |
| 2018/0052186 | A1 * | 2/2018 | Su | G01N 21/35 |
| 2021/0239732 | A1 * | 8/2021 | Osechinskiy | G01N 3/42 |

OTHER PUBLICATIONS

International Search Report and Written Opinion—PCT/NL2022/050760—mailing date Jun. 29, 2023.

* cited by examiner

SCANNING PROBE MICROSCOPY SYSTEM AND METHOD OF OPERATING SUCH A SYSTEM

CROSS-REFERENCE TO RELATED APPLICATIONS

This application is a U.S. National Stage application under 35 U.S.C. § 371 of International Application PCT/NL2022/050760 (published as WO 2023/121467 A1), filed Dec. 23, 2022, which claims the benefit of priority to Application NL 2030289, filed Dec. 24, 2021. Benefit of the filing date of these prior applications is hereby claimed. Each of these prior applications is hereby incorporated by reference in its entirety.

FIELD OF THE INVENTION

The present invention is directed at a scanning probe microscopy system comprising a sample support structure for supporting a sample including a sample surface, a sensor head including a probe comprising a cantilever and a probe tip arranged on the cantilever, a deflection sensor unit for obtaining a deflection sensor signal indicative of a deflection of the probe tip during scanning, and one or more actuators including: a Z-motion actuator for moving the probe tip in a direction transverse to the sample surface, and a scanning actuator for moving the probe tip laterally/parallel relative to the substrate surface; wherein the system further comprises a control unit configured for receiving the deflection sensor signal from the deflection sensor unit and for controlling the one or more actuators. The present invention is further directed at a method of operating a scanning probe microscopy system

BACKGROUND

Topography imaging of certain structures, in particular 3D samples with narrow and high aspect-ratio features that are abundant in the semiconductor or biomedical industry, with a scanning probe microscopy (SPM) system (such as an atomic force microscope (AFM)), requires usage of non-resonant oscillatory imaging methods. Existing methods differ in implementation but typically have some aspects in common. These include actuating the probe or the sample in a direction perpendicular to the surface (in Z) with repeating motion profile, and with that motion profile extract topography in each pixel of the image upon reaching a pre-defined value of tip-sample interaction force. Within that motion profile, these aspects further include retracting the probe from the surface, and performing relative motion of the probe with respect to the surface in a plane parallel to the surface (XY).

The conventional non-resonant oscillatory imaging modes thereby also typically suffer from a number of disadvantages. For example, topography height data is extracted based on a pre-defined value of the probe-sample interaction force. However, the shape and nature of surface features and the height differences within and between such features may vary a lot. Using the pre-defined probe-sample interaction force does not enable all features to be imaged correctly. This to some extend may be resolved by scanning the substrate surface a second time at a different pre-defined probe-sample interaction force. This, however, leads to a reduction of throughput and additional wear of the probe. Besides, drift of the probe position versus the sample surface (e.g. due to temperature differences or vibrations) works against accuracy and may even prevent or obscure imaging.

Another disadvantage is that in conventional non-resonant oscillatory imaging modes, retracting of the probe from the surface is typically performed using a fixed user-defined retract distance. This predefined retract distance may in some cases not be sufficient to completely detach probe from the surface, which may lead to damage of the probe and/or the sample surface when moving the probe to the next pixel. In other cases this predefined retract distance may be too large, which leads to an unnecessary slowdown of the procedure for each pixel and again results in a reduction of the throughput.

Furthermore, when the probe is about to detach from the surface, forces at the surface slightly delay detachment and thereby bias the probe, such that upon detachment the probe tip oscillates at the probe's eigen frequency. This vibration, sometimes referred to as ringing, needs to be minimized before measurement of the next pixel, which requires certain settling time before measurement of the next pixel. This settling time is also typically pre-set in the system. Therefore, if the settling time is set too short, the image quality is influenced by oscillation of the probe because the probe is still ringing. If the settling time is set too long, this again negatively influences the throughput of the measurements.

In industrial applications, the throughput of SPM system is of major importance. This, for example directly influences the throughput of semiconductor manufacturing. This however is not the only field of application wherein throughput plays a role. For example, also the use of SPM for examining a large number of e.g. biological samples would benefit from an increase in throughput. Similarly, the quality and accuracy of imaging is of importance in order to achieve a required level of quality.

SUMMARY OF THE INVENTION

It is an object of the present invention to overcome the abovementioned disadvantages, and provide an SPM system and method that enable to achieve a high throughput at excellent quality and accuracy.

To this end, there is provided herewith a system as described above, wherein the control unit comprises a plurality of signal processing units, wherein each of the plurality of signal processing units is configured for receiving the deflection sensor signal as provided by the deflection sensor unit and for providing a processed signal, each of the signal processing units being configured for cooperating with an associated triggering unit configured for comparing the processed signal of the respective processing unit against a predefined triggering condition, for generating a trigger signal when the triggering condition is met.

In the system of the present invention, the application of multiple signal processing units which are each associated with a triggering unit, enables to examine the deflection sensor signal in real time on the occurrence of a plurality of different conditions. The occurrence of such conditions are signaled by the triggering units generating a trigger signal and hence enable a more advanced manner of controlling the one or more actuators of the system. This may be used in a plurality of different ways in order to increase the throughput or the accuracy, or to prevent damage to the probe or sample. For example, where carefully selected multiple force thresholds are monitored in this manner, this obviates the need to perform multiple passes in order to correctly image various depths and shapes of surface features, which thus results in less replacements of the probe.

In some embodiments, each of the signal processing units is exclusively associated with a triggering unit, such that a number of triggering units and a number of associated processing units is equal. This enables each processed signal to be examined against it's uniquely associated triggering condition. In other or further embodiments, one or more of the signal processing units is associated with multiple triggering units. For example, in those cases wherein the processed signal is indicative of a certain physical parameter of the deflection signal, wherein the physical parameter is to be examined against a plurality of conditions, the processed signal from the respective signal processing unit may directly be made available to the multiple triggering units in order to reduce required processing power and increase processing speed.

The control unit of the present invention may be a single integrated circuit or may be a system of multiple integrated circuits, e.g. an electronic circuit comprising one or more integrated circuits. The control unit may also be embodied as a plurality of logical circuits; for example digital components combined with analog circuit elements. The various functions described may each be embodied as a dedicated element, consisting of one or more electronic circuits. Furthermore, as may be appreciated, a number of the described functions, e.g. the processing functions or the comparative function to perform triggering, may well be embodied in computer instructions which when loaded into a memory on-board the scanning probe microscopy (SPM) system (or a data repository remotely accessible by the SPM system), enable a controller circuit or central processing unit (CPU) or other circuit to perform the desired function. Such instructions, for example, may include algorithms or enable an operator to provide such algorithms to the SPM system. The skilled person will be aware of possible ways to implement the above, in view of the description provided herewith.

In some embodiments, one or more of the plurality of signal processing units is configured for processing the deflection sensor signal such as to provide the processed signal to be indicative of a static deflection of the probe tip. The term 'static deflection', as applied herein, is intended to refer to the non-oscillatory deflection behavior of the probe. For example, the low frequency components of the motion of the probe tip which are below the cantilever's first resonance frequency. In other or further embodiments, one or more of the plurality of signal processing units is configured for processing the deflection sensor signal such as to provide the processed signal to be indicative of a dynamic deflection of the probe tip. The term 'dynamic deflection' as applied herein, is intended to refer to the high frequency oscillatory behavior of the system, e.g. starting at or close to the cantilever's first resonance frequency or above this. The both types of behavior of the probe tip may be examined in order to enable generating trigger signals that may be applied to control certain aspects of probe and/or sample motion in the system. Each one of the actuators or motion aspects may in principle be controlled in this manner, as will be discussed further down below.

The one or more actuators may consist of a single actuator unit or a plurality of actuator units, without any limitation on the claimed invention. For example, a system of multiple actuators, each actuator being responsible for driving one or more degrees of freedom of the motion of one or more elements of the SPM system, may be applied. These actuators may additionally include vibration actuators or acoustic actuators to apply e.g. a vibration to the probe and/or the sample. Furthermore, the actuators may include translational actuators or rotational actuators, in or around an X, Y or Z direction in the system.

In some embodiments, each triggering unit is configured for comparing the processed signal of the respective processing unit against a different triggering condition. With this, it is meant that of all the triggering units in the system, each triggering unit applies a triggering condition that differs from the triggering conditions of the other triggering units, thereby thus being unique in the system. Although this feature is not essential, this enables to verify the deflection sensor signal against a plurality of different criteria simultaneously. For example, the criteria may include processing the signal to obtain a measure of the probe-sample interaction force, and comparing this against multiple force thresholds. Also, the deflection sensor signal may be processed to measure an amplitude of a high frequency signal, e.g. around the probe's eigen frequency, and compare it against a threshold to determine whether or not the probe vibration, after detachment from the surface, has settled. Alternatively or additionally, some of the triggering conditions of two or more triggering units may be the same; a benefit thereof is that this may be used in order to perform different action responsive to a same trigger. For example, a same trigger condition may be used in a low-pass filter combination as well as in a high-pass filter combination, such as to perform a first action in case a sensed frequency is below a certain threshold and to perform a second action (different from the first action) in case the sensed frequency is above this same threshold. Other situations may be thought of wherein a same triggering condition may give rise to different actions, depending on the circumstances.

In some embodiments, at least two of the triggering units, for comparing the processed signal, are configured for evaluating a same physical parameter, and the triggering conditions of the at least two triggering units with respect to said physical parameter are mutually different. Thus, for example, the processed signal may be indicative of a particular physical parameter (e.g. the amplitude of a dynamic deflection signal) and the triggering conditions compare the amplitude of the dynamic signal with a first and a second threshold. The first threshold for example may trigger the detection of ringing of the probe upon detachment and the second threshold indicates that the ringing is sufficiently settled in order to enable an approach to the surface again (for obtaining a new measurement). Alternatively or additionally, also the probe-sample interaction force can be compared against different thresholds or other conditions in order to improve the quality of the measurement. In non-resonant oscillatory imaging mode, the probe is pressed onto the surface and may slightly depress the surface dependent on this force. Generating a trigger at different force thresholds enables to register the probe deflection signal at specifically pre-defined values of the exerted probe-sample interaction force.

In some embodiments, the physical parameter is at least one of a group comprising: probe tip deflection, force exerted on the probe tip, torsion of the probe tip, amplitude of the deflection sensor signal, frequency of the deflection signal, phase of the deflection sensor signal. The invention is not limited to these parameters, and the simultaneous multiple processing of the deflection sensor signal may be performed to gain insight in other physical parameter not explicitly mentioned here.

In some embodiments, each of the at least two triggering units, in accordance with its associated triggering condition for evaluating said physical parameter, compares the deflection sensor signal against a threshold, wherein the thresholds of the at least two triggering units are mutually different. The advantages of these embodiments have been touched upon herein before. For example, in non-resonant oscillatory imaging modes, this would be advantageous in order to enable capturing the deflection signal upon occurrence of various conditions with respect to the probe-sample interaction force. The force on the probe tip may be determined by examining the bending of probe tip due to the force, which may be done by analyzing the deflection sensor signal. Bending occurs while the probe tip depresses the surface, but also prior to detachment due to adhesive forces exerted by the surface on the probe tip. Both parameters may be of interest and can be analyzed using dedicated signal processing units in combination with triggering units in a method of the present invention.

In some embodiments, the control unit further comprises a motion profile generator configured for generating a motion signal for controlling the one or more actuators, wherein the motion profile generator is configured for receiving the trigger signals from the triggering units, for controlling operation of the one or more actuators dependent on the trigger signals. This enables to directly control motion of the probe dependent on the generation of triggers. For example, in non-resonant oscillatory imaging modes, the settling time can be made dependent on the amplitude of the high frequency ringing motion of the probe, as mentioned above. As another example, the capturing and registration of the topography signal upon the probe-sample interaction force being at a certain value may be implemented in this way. Furthermore, by detecting the occurrence of a high frequency ringing signal (e.g. by its amplitude or frequency component in the deflection sensor signal) the moment of detaching of the probe from the surface can be detected and a trigger may be generated to cease a retract motion. The probe will thus not be retracted more than necessary (optimized) to prevent damage to the surface, and subsequently the parallel motion of the probe relative to the surface may be carried out to move to a next pixel. By optimizing this, the parallel motion can be performed earlier and thereby throughput of the system is increased.

In some embodiments, the system further comprises a Z-displacement sensor configured for generating a Z-displacement sensor signal indicative of a Z-position of the probe in the direction transverse to the sample surface, wherein the system is configured for storing current Z-position data in a data repository, such as a memory or a database, upon at least one of the triggering units generating a trigger signal. The benefits of these embodiments have been mentioned; the capturing and registration of the Z-displacement signal upon the probe-sample interaction force being at a certain value may be implemented in this way.

In some embodiments, multiple of the signal processing units comprise a low pass filter for providing the processed signal to be indicative of a static deflection of the probe tip, and wherein the triggering units with said multiple of the signal processing units each compare the processed signal with a threshold force exerted on the probe tip, the control unit being configured for operating the Z-motion actuator to commence retracting the probe tip away from the sample surface upon receipt of a predetermined trigger signal of said triggering units. This enables to capture a number of values at different threshold forces, and then retract the probe at the desired threshold force automatically.

In some embodiments, at least one of the signal processing units comprises a lock-in amplifier which at least is configured for providing an amplitude data of an oscillating motion of the probe tip, wherein the triggering unit associated with the at least one signal processing unit is configured for generating a trigger signal when the amplitude is below an amplitude threshold level. In this embodiment, the ringing motion of the probe after detachment is monitored. When the ringing has sufficiently settled, the probe may start to be moved towards the surface again using the Z-displacement actuator.

As described above, in some embodiments, the control unit upon receipt of the trigger signal of the triggering unit associated with the at least one signal processing unit, is configured for at least one of: operating the scanning actuator for moving the probe tip parallel to the surface to a next position; operating the Z-motion actuator to start retracting the probe tip from the surface, or operating the Z-motion actuator to cease retracting the probe tip from the surface.

The present invention is not limited with respect to the type of deflection sensor applied. In some embodiments, the deflection sensor unit comprises at least one of: an optical beam deflection unit, a piezoelectric sensor unit, a piezoresistive sensor unit, or a capacitive deflection sensor unit. In principle, any type of deflection sensor that is accurate enough in accordance with the requirements of the SPM system may be used in combination with the present invention.

In a second aspect thereof, there is provided herewith a method of operating a scanning probe microscopy system for performing scanning probe microscopy on a sample including a sample surface, wherein the system comprises: a control unit, a sensor head including a probe comprising a cantilever and a probe tip arranged on the cantilever, a deflection sensor unit for obtaining a deflection sensor signal indicative of a deflection of the probe tip during scanning, and one or more actuators including: a Z-motion actuator for moving the probe tip in a direction transverse to the sample surface, and a scanning actuator for moving the probe tip relative to the substrate surface; wherein the method comprises receiving, by the control unit, the deflection sensor signal from the deflection sensor unit; and controlling, by the control unit, the one or more actuators dependent on the received deflection sensor signal; wherein, for performing the step of controlling, the deflection sensor signal is simultaneously processed by a plurality of signal processing units of the control unit, such that each of the plurality of signal processing units provides a processed signal and wherein each of the signal processing units cooperates with an associated triggering unit, each trigger unit thereby performing a step of comparing the processed signal against a predefined triggering condition, for generating a trigger signal when the triggering condition is met.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
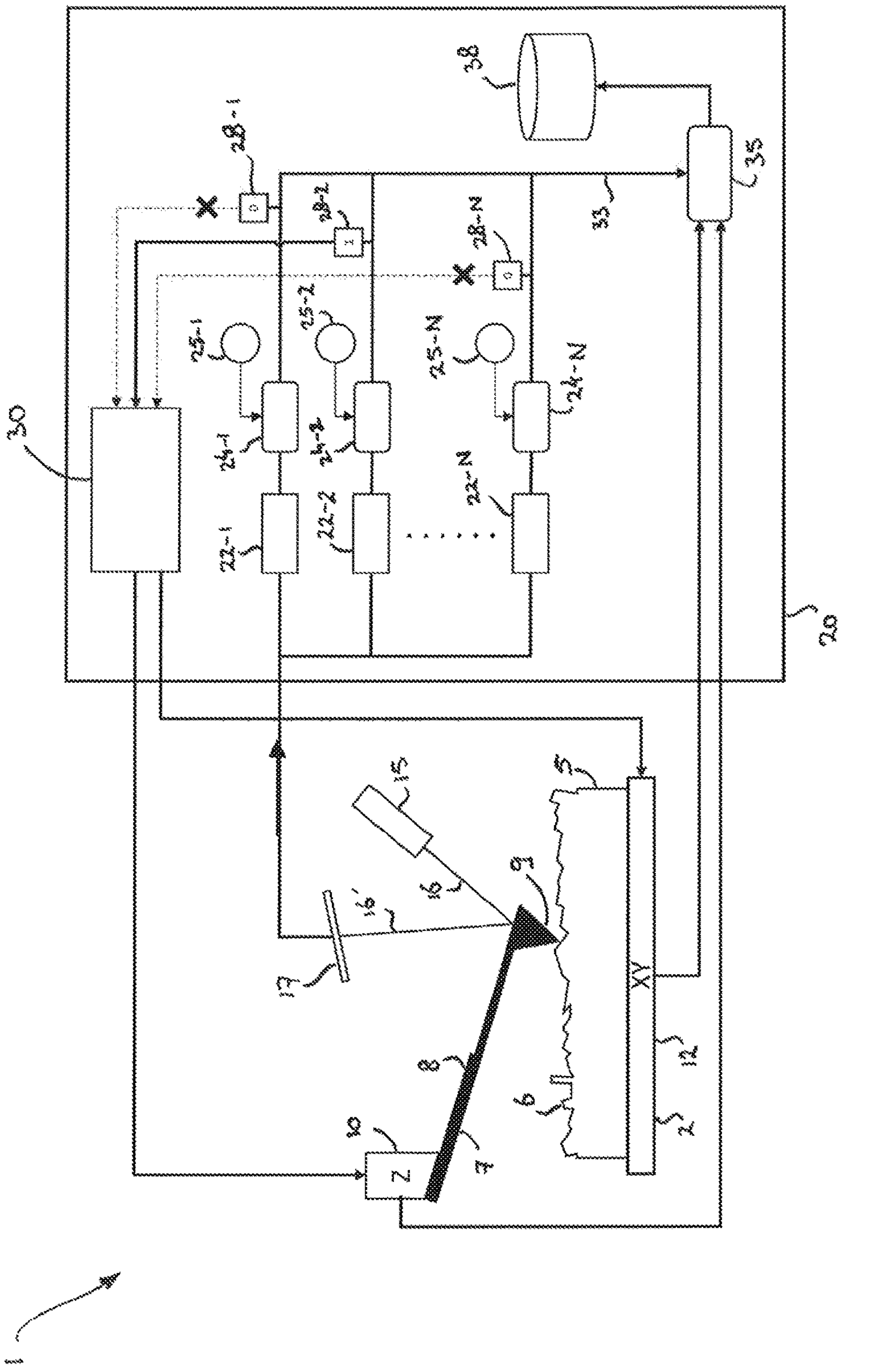
FIG. 1 schematically illustrates a scanning probe microscopy system in accordance with an embodiment of the present invention.

FIG. 1 schematically illustrates a scanning probe microscopy system 1 in accordance with an embodiment of the present invention. In FIG. 1, only some parts of the SPM system are illustrated, such as to not obscure the description with other parts of the system being of lesser importance to the invention. FIG. 1 schematically illustrates a sample carrier 2 bearing a sample 5 having a sample surface 6. The sample carrier 2 comprises an XY actuator 12 that enables to move the sample 5 relative to a probe 7 of the system 1 in a direction parallel to the carrier 2. The system 1 further comprises the probe 7 comprising a cantilever 8 and a probe tip 9. In use, for performing measurements of e.g. the topography of the sample 5, the probe tip 9 is to be brought in contact with the surface 6 at least temporarily in order to determine for example the local height of the surface 6. When the probe tip 9 is in contact with the surface 6, the deflection of the tip 9 in general is different than when the probe tip 9 is not in contact with the surface 6. By vibrating the tip 9 during sensing, or by periodically bringing the probe tip 9 in touch with the surface 6, the amplitude of this periodic or vibrating motion will thus change dependent on the local height of the surface 6. Therefore, by monitoring the deflection of the probe tip 9, measurements can be performed. The deflection of the probe tip 9 may be caused by deformation of the cantilever 8. The probe 7 is mounted on a Z-position actuator 10 which enables it to be brought in contact with the sample surface 6 and be retracted there from in use. The actuators 10 and 12 are operated by a control unit 20 comprising a motion profile generator 30 that controls operation of the actuators. While measuring, in principle, the probe tip 9 relative to the sample surface 6 does not move, or moves only slightly, in the XY direction. To this end, for moving the probe tip 9 to a next pixel of the image to be made, the probe tip 9 is retracted from the surface by the Z position actuator 10, and the XY actuator 12 is operated in order to move the probe 7 and the sample 5 relative to each other to a next pixel. Thereafter, the Z position actuator 10 is operated again in order to extend the probe 7 towards the surface 6 in order for the probe tip 9 to make contact therewith.

Measuring is performed using an optical beam deflection unit comprising the laser 15 and an optical sensor 17. Optical sensor 17 may for example be a four quadrant optical sensor that determines the shift of a spot formed by laser beam 16 and 16' on the surface of the sensor 17. The beam 16 is provided by laser unit 15 which reflects on the backside of the probe 9 into reflected beam 16'. The optical beam deflector unit, using the optical sensor 17, provides at its output a deflection sensor signal which is provided to the control unit 20.

In accordance with the present invention, control unit 20 comprises a plurality of signal processing units 22-1, 22-2, 22-*i* through 22-N. The number of signal processing units may be freely determined in the design, depending on the needs. Each of the signal processing units 22 is associated with a corresponding triggering unit 24. Processing unit 22-1 is associated with triggering unit 24-1, processing unit 22-2 is associated with triggering unit 24-2 and so forth, such that processing unit 22-N is associated with triggering unit 24-N. It is not essential that each processing unit 22 is exclusively associated with a single triggering unit. For example, in some embodiments, a processing unit 22 may be associated with multiple different triggering units 24. In other or further embodiments, multiple processing units 22 may be linked to a same triggering unit 24. This is dependent on the application and the requirements of the design at hand. Furthermore, each of the triggering units compares the output of the processing unit 22 associated therewith with a condition 25. The triggering conditions 25-1 through 25-N can be predetermined by the operator of the SPM system 1. For example each of the triggering conditions 25-1 through 25-N may be different such that different triggering conditions may be checked by each of the triggering 24-1 through 24-N. Furthermore, at the output of the triggering units 24-N, trigger signals are provided which are all provided to a registration unit 35 to be discussed later. Furthermore, each of the output signals of the triggering unit 24-1 through 24-N may selectively also be provided to the motion profile generator 30. To this end, a selector unit 28-1 through 28-N is associated with each of the triggering units 24-1 through 24-N. It is to be noted that the selector unit is not essential in the system. The triggering signals may be dealt with by the motion profile generator in a different way in case the selectors 28-1 through 28-N are absent. The registration unit 35, upon receiving any trigger signal from any of the triggering units 24-1 through 24-N may perform a registration of the actuator positions of actuators 10 and 12. Furthermore, a control unit 20 may also be configured for registering the output signal 17 upon receipt of a triggering signal via connection 33. A registered measurement data and actuator positions are stored in a memory 38 of the SPM system.

Figure 2:
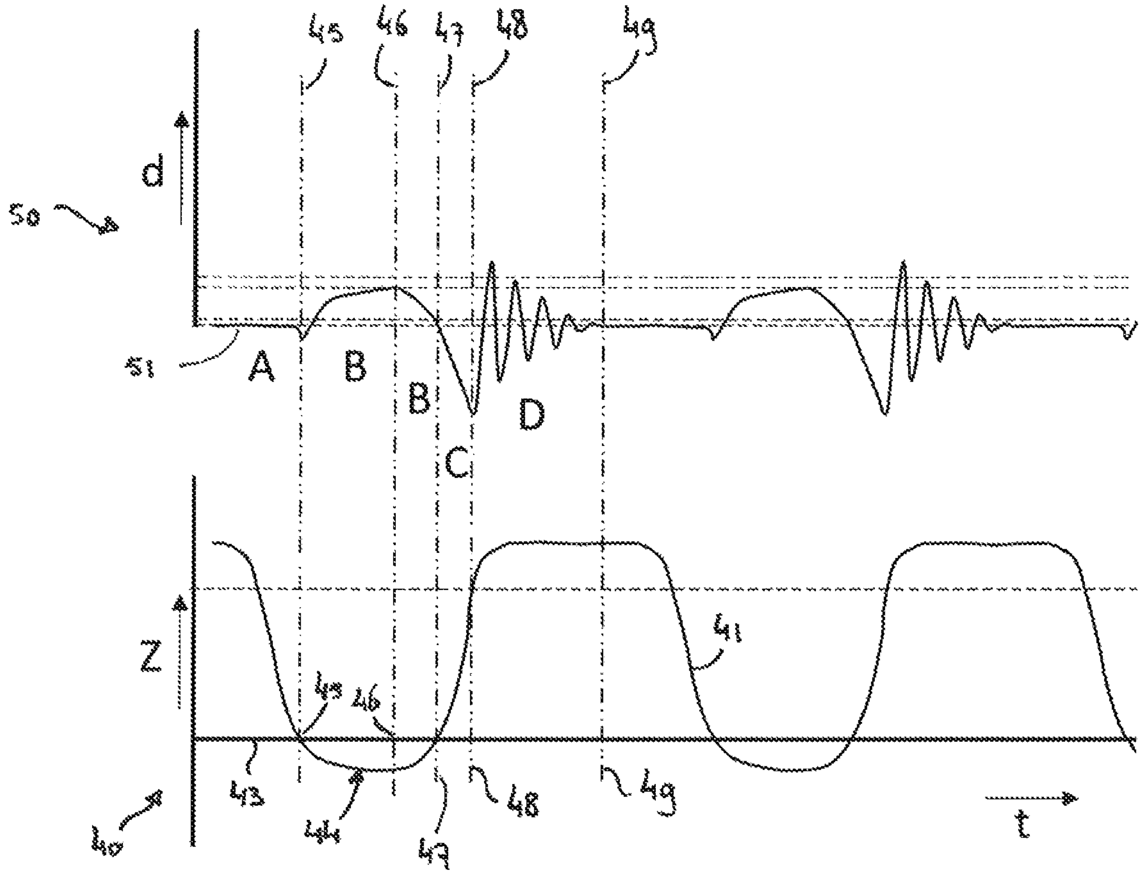
FIG. 2 schematically illustrates two graphs of a Z-position signal for an Z-actuator and for a measured deflection signal from a probe tip in an embodiment of the present invention.
Figure 3:
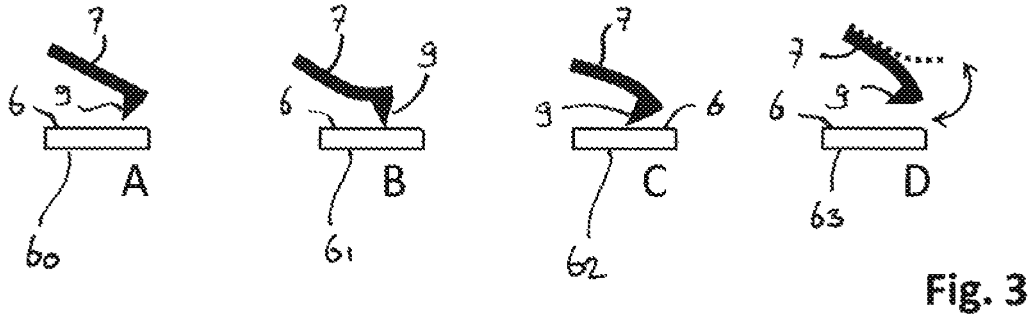
FIG. 3 schematically illustrates four probe deflection situations associated with certain positions in FIG. 2.

FIG. 2 illustrates schematic graphs of the probe deflection signal 51 and the Z-position actuator signal 41 in an SPM system in accordance with an embodiment during non-resonant oscillatory imaging mode. The lower graph illustrates the Z-position actuator signal 41 driving the probe 7 to and from the surface 6 of the substrate 5. The horizontal axis is indicative of time, and the level of axis 43 corresponds with the Z-level at which the probe tip 9 just contacts the surface 6. Extending the probe 7 further towards the surface 6 in the negative Z direction causes the reactive force of the surface 6 on to the probe tip 9 to increase. Thus, at Z-levels below the axis 43, a probe-sample interaction force is exerted on the probe tip 9. The upper graph schematically illustrates the deflection signal 51 of the probe tip 7 over time. The deflection signal 51 is represented by parameter d. As can be seen in the lower graph 40, starting from an extracted position at a remote Z-level, the Z position actuator signal 41 further drives the probe 7 (and probe tip 9) towards the surface 6. The vertical lines 45, 46, 47, 48, 49 mark characteristic points in time that will be discussed below. While the probe 7 is extended towards the surface 6 of the sample 5, as indicated by the Z-position signal 41, at point 45 in time, the probe tip 9 first contacts the surface 6 of the sample. This is the point where signal 41 crosses the axis 43. In the deflection signal 51, while the probe 7 approaches the surface 6 prior to point 45, in a first stage A of the deflection signal 51, no deflection of the probe tip 9 is measured as is illustrated by the flat line 51 in this stage. In FIG. 3, stage A is schematically illustrated in situation 60 showing the position of the probe tip 9 and the probe 7 in relaxed state above the surface 6.

Just upon touching, at time point 45, the probe tip 9 is briefly attracted by the surface as illustrated by the dip in deflection signal 51. The Z-position signal 41 indicates that the probe 7 is further extended towards the surface 6 such as to increase the probe-sample interaction force. The part 44 of the Z-position signal 41 illustrates this by showing a negative Z-position. Extension of the probe 7 towards the surface 6 is continued until at time point 46 a threshold level in the probe-sample interaction force is reached. Thereafter, between 46 and 47, the probe 7 is retracted again showing an increase in the Z-position signal 41. A period between moments 45 and 47 wherein the Z-position signal 41 is negative, corresponds with stage B in the deflection signal. Stage B in fact consists of a first and a second part, corresponding to a part before the maximum in the deflection signal 51 prior to point 46, and after the maximum between time points 46 and 47. The situation in stage B is in FIG. 3 schematically illustrated by situation 61. As can be seen, the positive probe-sample interaction force causes the probe 9 to bend backward thereby providing the positive deflection signal 51 between points 45 and 47 in FIG. 2.

At point 47, the probe 7 is at the Z-position corresponding with the level of axis 43 where the probe-sample interaction force is zero. The probe 7 is further retracted from the surface 6 until the probe tip 9 will be released. However, prior to this moment, between time points 47 and 48, adhesive forces pull on the probe tip 9 to thereby exert a negative force on the probe tip 9 such that contact between the probe tip 9 and the sample surface 6 is maintained during retracting the probe. This part of the deflection signal is indicated by stage C. In FIG. 3, stage C is illustrated by situation 62, showing the negative deflection of the probe tip 9 caused by adhesive forces between the surface 6 and probe tip 9. At time point 48, the probe 7 has been retracted to such an extent that the balance between the adhesive forces and the forces exerted by the Z-actuator on the probe-tip combination can no longer be maintained. Here, the probe tip 9 is released from the surface 6 and starts vibrating at its Eigen frequency. This stage D of the deflection signal 51 is called ringing and is schematically illustrated in FIG. 3 by situation 63. The ringing continues until it dies out and the probe as from time point 49 is in a relaxed state again corresponding to stage A, after which the next extension to the surface may commence. Between points 48 and the next approach to the surface after moment 49, the probe may move laterally relative to the sample 5 towards a next pixel to the image. This process repeats itself until all pixels have been imaged.

In the description below, a number of different embodiments and possibilities are schematically explained achievable with the present invention. The invention is not limited to these embodiments. In principle, every signal processing unit 22 in the control unit 20 may perform any desired signal processing method in order to provide a processing signal from which any desired signal parameter can be obtained. Also, in the trigger units 24, any desired trigger condition 25 may be verified to control the imaging process of the SPM system. Some examples thereof are provided in FIGS. 4 through 6 and will be discussed below. Reference thereby is made to the deflection signal 51 and Z-position signal 41 which is repeated in each of the FIGS. 4B, 5B and 6B below the FIGS. 4A, 5A and 6A respectively.

Figure 4A:
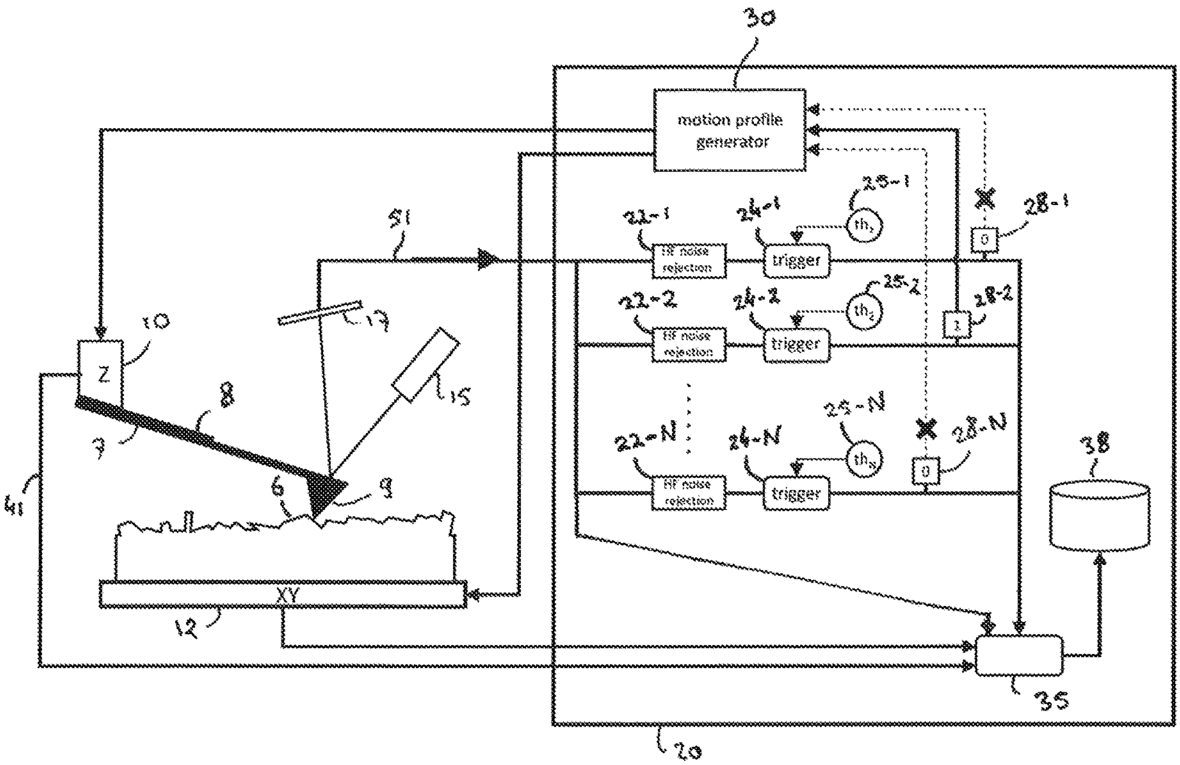
FIGS. 4A and 4B schematically illustrate a scanning probe microscopy system in accordance with an embodiment of the invention and an associated deflection signal and Z position signal during operation.
Figure 4B:
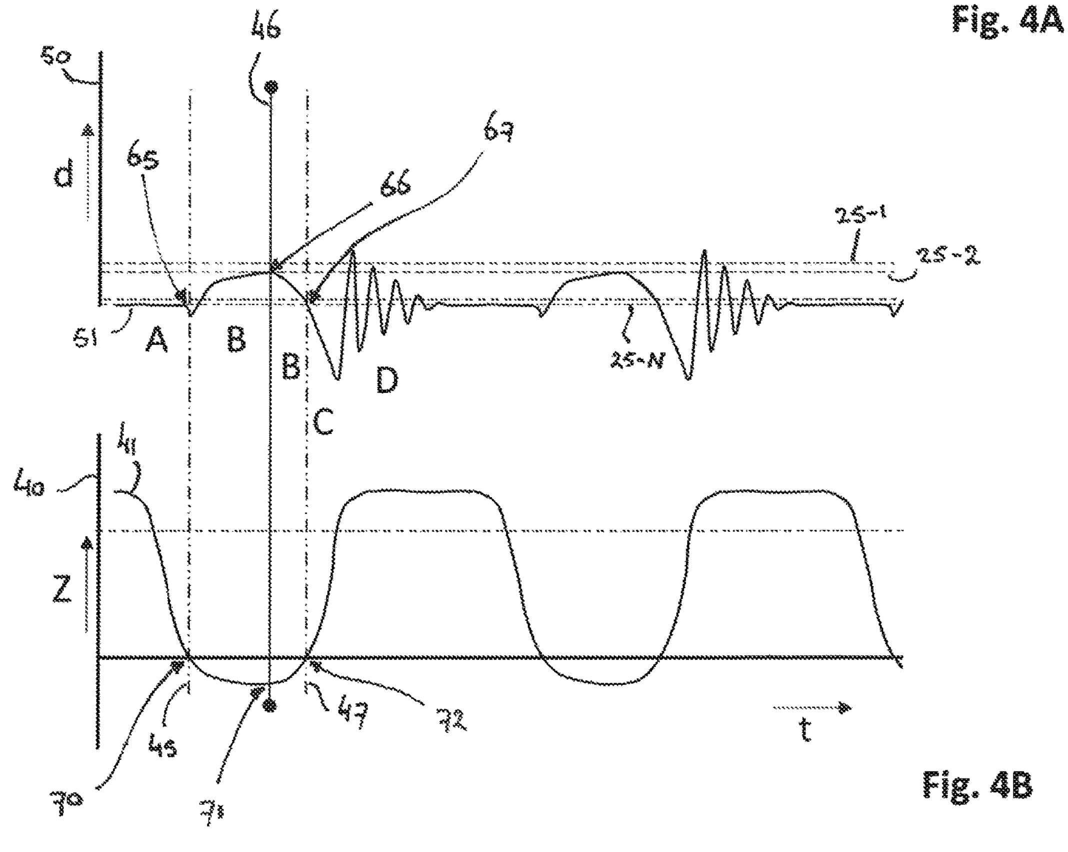

FIGS. 4A and 4B illustrate an embodiment wherein the control unit 20 has been configured to analyze the probe-sample interaction force against the plurality of different threshold levels. The deflection sensor signal 51 is provided by the deflection sensor 17 to the control unit 20, wherein it is received by a plurality of signal processing units 22-1, 22-2 through 22-N. Although the units 22-1 through 22-N are illustrated in FIG. 4A as separate units, in principle it is possible to combine the signal processing into a single processing unit 22 and a plurality of trigger units 24-1 through 24-N. In the triggering unit 24-1 through 24-N, each triggering unit verifies whether the associated trigger condition 25 is satisfied. In the embodiment of FIG. 4A, the probe-sample interaction force is checked against a plurality of different thresholds $th_1$ through $th_N$ provided by trigger conditions 25-1 through 25-N. A trigger is generated by each of the triggering units 24-1 through 24-N for each satisfied condition 25-1 through 25-N. When a trigger is generated by a respective triggering unit 24-1 through 24-N, this is passed on to the registration unit 35 which registers the current deflection signal 51 as well as the Z-position signal 41 and the XY position signal indicating the pixel that is imaged. This data is stored in memory 38 of the SPM system. Furthermore, the control unit 20 is configured for tracking against at least one of the trigger conditions 25-1 through 25-N to be satisfied in order to control the motion profile generator 30. In the embodiment of FIG. 4A, this is illustrated schematically by selectors 28-1 through 28-N. A selector illustrating a '0' therein is indicative of discarding a trigger signal. A selector 28-1 through 28-N showing a '1' therein is indicative of selecting the respective trigger signal by the control unit 20. In the embodiment illustrated in FIG. 4A, trigger signal 28-2 is selected for controlling the motion profile generator 30. This means that the trigger condition 25-2 indicative of thresholds $th_2$ is verified by triggering unit 24-2 in order to be satisfied, and if so this controls the motion profile generator to start retracting the probe 7 from the surface 6 again.

In FIG. 4B, the respective trigger conditions 25-1 through 25-N that are verified by each of the triggering units 24-1 through 24-N are schematically illustrated by levels 25-1 through 25-N in graph 50. These trigger conditions 25-1 through 25-N are arbitrarily chosen in order to enable explanation of the working principle. In reality these may be selected to be different, for example the level of triggering condition 25-1 may be selected to be below the level of triggering condition 25-2. Also, additional triggering conditions may be added or some of the triggering conditions 25-1 through 25-N may be absent. In the example illustrated in FIGS. 4A and 4B, the level 25-2 is the threshold level verified for retracting the probe 7 from the surface 6 again. As can be seen in signal 51, upon reaching level 25-2, the probe-sample interaction force decreases again, and corresponds to the increase in the Z-position signal 41 in graph 40 of FIG. 4B. Although in FIG. 4B this appears to happen immediately, this may in reality happen somewhat delayed due to delays in the system, such as inertia of Z-scanner. The other levels 25-1 through 25-N may be checked for performing certain actions, such as control of certain system parts or registrations of the deflection sensor signal 51, the Z-position signal 41 and the XY actuator signals of the SPM. For trigger condition 25-N, this condition is met in time point 45, corresponding to point 65 in the deflection signal 51. The motion profile generator 30 in FIG. 4A, upon receiving the trigger signal at time point 46 illustrated in FIG. 4B, is programmed to commence retracting the probe 7 from the sample surface 6 again, and after a certain period of settling time, controlling the XY actuator 12 in order to move to the next pixel. In the embodiment of FIG. 4A, only the probe-sample interaction force is analyzed against a plurality of triggers 25. Note that the above settling time could be absent, in the sense that the probe may optionally be moved while still ringing.

Figure 5A:
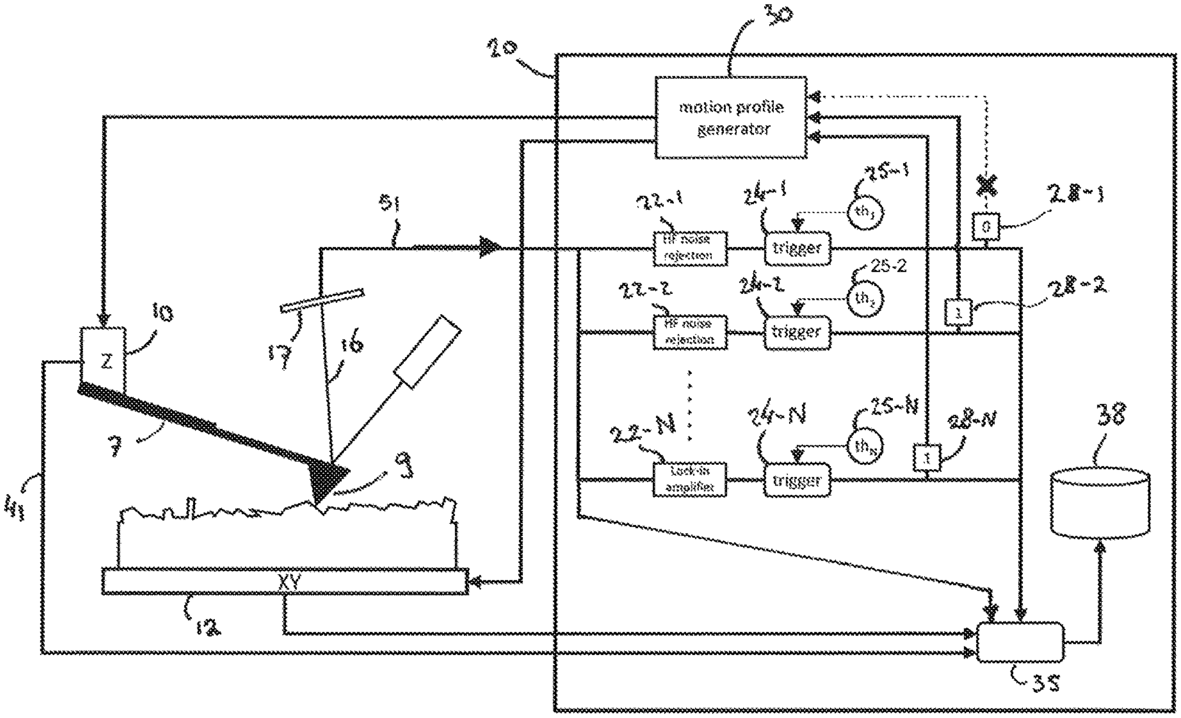
FIGS. 5A and 5B schematically illustrate a scanning probe microscopy system in accordance with an embodiment of the invention, and a Z position signal and probe deflection associated therewith.
Figure 5B:
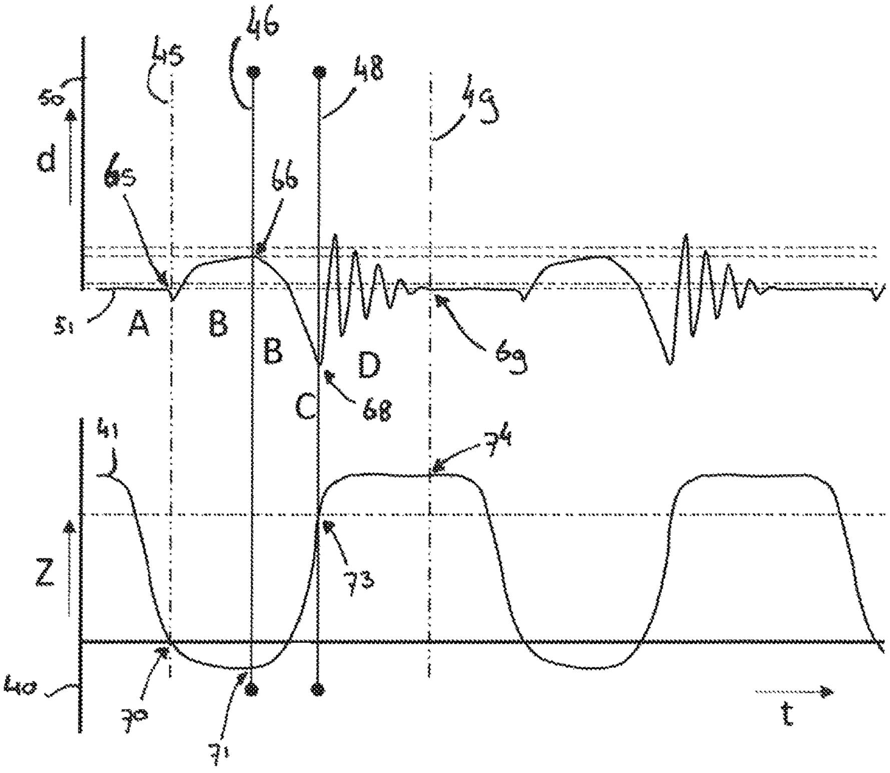

In a further embodiment illustrated in FIGS. 5A and 5B, one of the signal processing units 22 is configured for analyzing a part of the frequency spectrum of the deflection sensor signal 51. Here, the signal processing unit 22-N is embodied by a lock-in amplifier which at least provides a part of the deflection signal 51 corresponding to a frequency band including an Eigen frequency of the probe 7. As a result, the triggering unit 24-N associated with signal processing unit 22-N, is able to determine the presence or absence of a signal component of sufficient strength in this frequency band. Here, the triggering conditions 25-N check against a threshold $th_N$ indicative of a strong enough signal that indicates ringing of the probe 7. Therefore, this triggering unit 24-N produces a trigger signal at time point 48 in FIG. 5B upon occurrence of a ringing signal in stage D of the deflection sensor 51. Signal processing unit 22-2 and triggering unit 24-2 together produce a trigger signal when the maximum desired threshold force of the probe-sample interaction force is reached. As in the example in FIG. 1, also in the example of FIG. 5, each of the output signals of the triggering unit 24-1 through 24-N may selectively be provided to the motion profile generator 30; and this can be indicated by using selector units 28-1 through 28-N. Each of these selectors 28-1 through 28-N is associated with one of the triggering units 24-1 through 24-N. To indicate that the trigger signals 24-N and 24-2 are used by the motion profile generator 30, selectors 28-N and 28-2 are each set at '1' to provide these corresponding trigger signals to the motion profile generator 30. Hence, at moment 46, in point 71 of the Z-position signal 41 and point 66 of the deflection sensor signal 51 may be marked as the moment at which the probe 7 will be retracted again from the surface 6. From time point 48 onwards (i.e. point 68 of the deflection sensor signal 51), the occurrence of a ringing of the probe 7 can be detected by triggering unit 24-N. At this point, the Z-position signal is at point 73 in graph 40. The motion profile generator 30 upon receipt of the trigger signal from triggering unit 24-N, is notified of the fact that the probe tip 9 is now free from the surface 6 and the probe 7 is ringing. Therefore, the XY actuator 12 may be controlled to move to the next pixel, and after expiry of the settling time set in control unit 20, the Z-position actuator 10 may be controlled to extend the probe 7 towards the surface 6 again. In the embodiment of FIGS. 5A and 5B, no triggers are generated when the ringing of the probe 7 has settled. In principle, it is possible to check whether the probe 7 has settled by checking against one of the lowest threshold levels of the deflection signal 51. This may advantageously be used in other or further embodiments of the invention. Furthermore, like in FIGS. 4A and 4B, also in the embodiments illustrated in FIG. 5A, the data from the actuator signals and the deflection sensor signal 51 are registered by registration unit 35 in the memory 38 upon receipt of each of the triggers from the triggering unit 24-1 through 24-N.

Figure 6A:
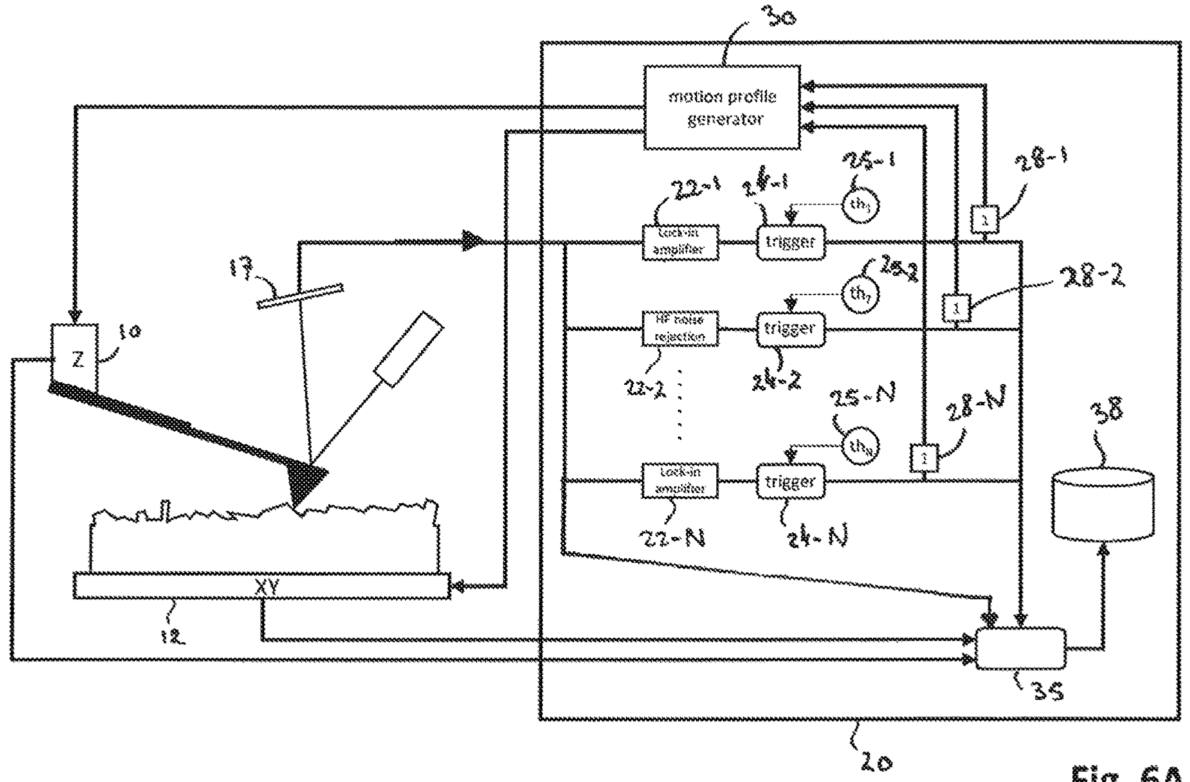
FIGS. 6A and 6B schematically illustrate a scanning probe microscopy system in accordance with an embodiment of the present invention, and a Z position signal and probe deflection associated therewith.
Figure 6B:
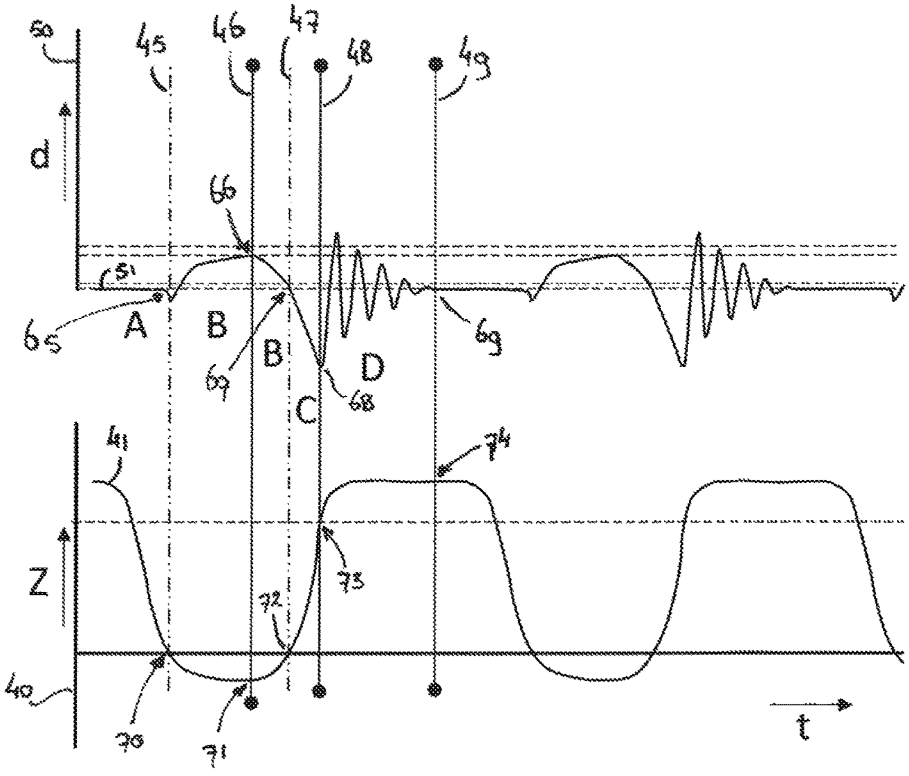

In FIGS. 6A and 6B, a further embodiment of SPM system in accordance with the present invention is illustrated. Here, a lock-in amplifier 22-N is present as one of the signal processing units 22 to check against the occurrence of the ringing after time point 48. In addition, a further lock-in amplifier 22-1 is associated with triggering unit 24-1 to check against settling of the ringing signal from probe 7. The embodiment of FIGS. 6A and 6B is in many aspects similar to that of FIGS. 5A and 5B, at least except for the additional lock-in amplifier 22-1. As stated above, although different lock-in amplifiers are illustrated, these may all be implemented by a single lock-in amplifier in combination with multiple triggering units. The selectors 28-1, 28-2 to 28-N (note that the dots between units 22-2 and 22-N indicate an optional and arbitrary number of potential further processing units) each enable to provide these triggering signals also to the motion profile generator 30, by setting their values to '1' (or 'true' or another corresponding Boolean value). Additional triggering units that are not specifically illustrated in FIG. 6A may generate triggers under any desired circumstances, for example at time point 45 for registration of data in memory 38. In the embodiment of FIG. 6A, triggering unit 24-2, in accordance with triggering condition 25-2, generates a trigger when the maximum probe-sample interaction force is reached at point 66 in the deflection sensor signal 51, at time point 46. This is the moment after which the motion profile generator 30 will retract the probe 7 from the surface 6. The next trigger is generated by lock-in amplifier 22-N in combination with triggering unit 24-N. This trigger is generated when the probe 7 starts ringing upon release of the probe tip 9 from the sample surface 6. The motion profile generator 30 is aware that the probe tip 9 is now free from the sample surface 6, and may thus be moved to the next pixel by controlling the XY actuator 12. Furthermore, a further trigger signal is produced at time point 49, when the deflection sensor 51 at the Eigen frequency has dropped below the threshold level indicated by condition 25-1. Triggering unit 24-1 will then produce a trigger signal which is passed on via selector 28-1 to the motion profile generator 30. For the motion profile generator 30, this marks a point in time wherein the ringing of the probe 7 has stopped, and the probe 7 may safely be extended towards the surface 6 in the next pixel. Therefore, after time point 49 in graph 40 of FIG. 6B, the Z-position signal 41 will decrease again showing an extension of the probe 7 towards surface 6. The process of imaging the next pixel thereby has commenced.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. Where a decrease or increase of a certain parameter is described, this is not to be interpreted as limiting because the inverted parameter could likewise be applied similarly. If a decrease in Z-level is mentioned, it is meant that the probe is extending towards the surface, whereas an increase retracts the probe from the surface. Of course, this is dependent on the definition of the positive direction of Z, and could well be the other way around if a different definition is used. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise than as specifically described herein, and is only limited by the appended claims.

The invention claimed is:

1. A scanning probe microscopy system comprising a sample support structure for supporting a sample including a sample surface, a sensor head including a probe comprising a cantilever and a probe tip arranged on the cantilever, a deflection sensor unit for obtaining a deflection sensor signal indicative of a deflection of the probe tip of the probe during scanning, and one or more actuators including: a Z-motion actuator for moving the probe tip in a direction transverse to the sample surface, and a scanning actuator for moving the probe tip relative to the substrate surface;

wherein the system further comprises a control unit configured for receiving the deflection sensor signal associated with the probe from the deflection sensor unit and for controlling the one or more actuators, wherein for simultaneously providing a plurality of processed signals, the control unit comprises a plurality of signal processing units, wherein each of the plurality of signal processing units is configured for receiving the deflection sensor signal as provided by the deflection sensor unit and for providing at least one processed signal of the plurality of processed signals, each of the signal processing units being configured for cooperating with an associated triggering unit configured for comparing the processed signal of the respective processing unit against a predefined triggering condition, for generating a trigger signal when the triggering condition is met.

2. The scanning probe microscopy system according to claim 1, wherein the plurality of signal processing units include:

at least a first signal processing unit for providing a first processed signal; and at least a second signal processing unit for providing a second processed signal;

wherein the first signal processing unit is associated with a first triggering unit configured for comparing the first processed signal against a first triggering condition, and wherein the second signal processing unit is associated with a second triggering unit configured for comparing the second processed signal against a second triggering condition.

3. The scanning probe microscopy system according to claim 1, wherein each of the signal processing units is exclusively associated with a triggering unit, such that a number of triggering units and a number of associated processing units is equal.

4. The scanning probe microscopy system according to claim 1, wherein at least one of:

one or more of the plurality of signal processing units is configured for processing the deflection sensor signal to provide the processed signal to be indicative of a static deflection of the probe tip; or one or more of the plurality of signal processing units is configured for processing the deflection sensor signal to provide the processed signal to be indicative of a dynamic deflection of the probe tip.

5. The scanning probe microscopy system according to claim 1, wherein each triggering unit is configured for comparing the processed signal of the respective processing unit against a different triggering condition.

6. The scanning probe microscopy system according to claim 1, wherein at least two of the triggering units, for comparing the processed signal, are configured for evaluating a same physical parameter, and wherein the triggering conditions of the at least two triggering units with respect to said physical parameter are mutually different.

7. The scanning probe microscopy system according to claim 6, wherein the physical parameter is at least one of a group comprising: probe tip deflection, force exerted on the probe tip, torsion of the probe tip, amplitude of the deflection sensor signal, frequency of the deflection sensor signal, phase of the deflection sensor signal.

8. The scanning probe microscopy system according to claim 6, wherein each of the at least two triggering units, in accordance with its associated triggering condition for evaluating said physical parameter, compares the deflection sensor signal against a threshold, wherein the thresholds of the at least two triggering units are mutually different.

9. The scanning probe microscopy system according to claim 1, wherein the control unit further comprises a motion profile generator configured for generating a motion signal for controlling the one or more actuators, wherein the motion profile generator is configured for receiving the trigger signals from the triggering units, for controlling operation of the one or more actuators dependent on the trigger signals.

10. The scanning probe microscopy system according to claim 1, further comprising a Z-displacement sensor configured for generating a Z-displacement sensor signal indicative of a Z-position of the probe in the direction transverse to the sample surface, wherein the system is configured for storing current Z-position data in a data repository, upon at least one of the triggering units generating a trigger signal.

11. The scanning probe microscopy system according to claim 1, wherein at least one of the signal processing units comprise a low pass filter for providing the processed signal to be indicative of a static deflection of the probe tip, and wherein the triggering units with said at least one of the signal processing units each compare the processed signal with a threshold force exerted on the probe tip, the control unit being configured for operating the Z-motion actuator to commence retracting the probe tip away from the sample surface upon receipt of a predetermined trigger signal of said triggering units.

12. The scanning probe microscopy system according to claim 1, wherein at least one of the signal processing units comprises a lock-in amplifier which at least is configured for providing an amplitude data of an oscillating motion of the probe tip, wherein the triggering unit associated with the at least one signal processing unit is configured for generating a trigger signal when the amplitude is below an amplitude threshold level.

13. The scanning probe microscopy system according to claim 12, wherein the control unit, upon receipt of the trigger signal of the triggering unit associated with the at least one signal processing unit, is configured for at least one of: operating the scanning actuator for moving the probe tip parallel to the surface to a next position; operating the Z-motion actuator to start retracting the probe tip from the surface or operating the Z-motion actuator to cease retracting the probe tip from the surface.

14. The scanning probe microscopy system according to claim 1, wherein the deflection sensor unit comprises at least one of: an optical beam deflection unit, a piezoelectric sensor unit, a piezoresistive sensor unit, or a capacitive deflection sensor unit.

15. A method of operating a scanning probe microscopy system for performing scanning probe microscopy on a sample including a sample surface, wherein the system comprises: a control unit, a sensor head including a probe comprising a cantilever and a probe tip arranged on the cantilever, a deflection sensor unit for obtaining a deflection sensor signal indicative of a deflection of the probe tip of the probe during scanning, and one or more actuators including: a Z-motion actuator for moving the probe tip in a direction transverse to the sample surface, and a scanning actuator for moving the probe tip relative to the substrate surface;

wherein the method comprises:

receiving, by the control unit, the deflection sensor signal associated with the probe from the deflection sensor unit; and controlling, by the control unit, the one or more actuators dependent on the received deflection sensor signal;

wherein, for performing the step of controlling, the deflection sensor signal is simultaneously processed by a plurality of signal processing units of the control unit, such that each of the plurality of signal processing units provides at least one processed signal of a plurality of processed signals; and wherein each of the signal processing units cooperates with an associated triggering unit, each trigger unit thereby performing a step of comparing the at least one processed signal against a predefined triggering condition, for generating a trigger signal when the triggering condition is met.

16. The method according to claim 15, wherein the step of simultaneous processing includes at least one of:

processing, by one or more of the plurality of signal processing units, the deflection sensor signal to provide the processed signal to be indicative of a static deflection of the probe tip; or processing, by one or more of the plurality of signal processing units, the deflection sensor signal to provide the processed signal to be indicative of a dynamic deflection of the probe tip.

17. The method according to claim 16, wherein for at least two of the triggering units the step of comparing comprises evaluating a same physical parameter, wherein the triggering conditions with respect to said physical parameter are mutually different.

18. The method according to claim 17, wherein the physical parameter is at least one of a group comprising: probe tip deflection, force exerted on the probe tip, torsion of the probe tip, or if the deflection sensor signal is a dynamic signal: amplitude of the deflection sensor signal, or frequency of the deflection sensor signal, or phase of the deflection sensor signal.

19. The method according to claim 17, wherein each of the at least two triggering units, in accordance with its associated triggering condition for evaluating said physical parameter, compares the deflection sensor signal against a threshold, wherein the thresholds of the at least two triggering units are mutually different.

20. The method according to claim 15, further comprising generating a motion signal for controlling the one or more actuators, including receiving the generated trigger signals from the triggering units for controlling operation of the one or more actuators dependent on the trigger signals.

21. The method according to claim 15, wherein the processing of the deflection signal comprises low pass filtering for providing the processed signal to be indicative of a static deflection of the probe tip, and wherein the step of comparing comprises comparing the processed signal with a threshold force exerted on the probe tip, the step of controlling comprises operating the Z-motion actuator to commence retracting the probe tip away from the sample surface upon receipt of a predetermined trigger signal.

22. The method according to claim 15, wherein processing the deflection sensor signal comprises providing an amplitude data of an oscillating motion of the probe tip, wherein the step of comparing comprises generating a trigger signal when the amplitude is below an amplitude threshold level.

23. The method according to claim 22, wherein in response to receipt of the trigger signal the method comprises at least one of: moving the probe tip parallel to the surface to a next position; retract the probe tip from the surface; or cease retracting the probe tip from the surface.

* * * * *